US008135005B2

(12) United States Patent
Okagawa et al.

(10) Patent No.: US 8,135,005 B2
(45) Date of Patent: Mar. 13, 2012

(54) COMMUNICATION CONTROL SYSTEM, COMMUNICATION CONTROL METHOD, ROUTING CONTROLLER AND ROUTER SUITABLY USED FOR THE SAME

(75) Inventors: Takatoshi Okagawa, Yokosuke (JP); Manhee Jo, Yokohama (JP); Katsutoshi Nishida, Yokohama (JP); Noriteru Shinagawa, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1239 days.

(21) Appl. No.: 10/700,513

(22) Filed: Nov. 5, 2003

(65) Prior Publication Data

US 2004/0090963 A1  May 13, 2004

(30) Foreign Application Priority Data

Nov. 6, 2002 (JP) ................................. 2002-323129

(51) Int. Cl.
*H04L 12/28* (2006.01)
(52) U.S. Cl. ......... 370/389; 370/216; 370/237; 709/245
(58) Field of Classification Search ........................ None
See application file for complete search history.

(56) References Cited

U.S. PATENT DOCUMENTS

| 5,774,660 | A  | * | 6/1998  | Brendel et al. ................ 709/201 |
| 6,182,139 | B1 | * | 1/2001  | Brendel ......................... 709/226 |
| 7,212,527 | B2 | * | 5/2007  | Shah et al ..................... 370/389 |
| 7,366,147 | B2 | * | 4/2008  | O'Neill ......................... 370/338 |
| 2002/0120760 | A1 | * | 8/2002  | Kimchi et al. ................ 709/230 |
| 2003/0141093 | A1 | * | 7/2003  | Tirosh et al. ................ 174/72 A |
| 2004/0042402 | A1 | * | 3/2004  | Galand et al. ................. 370/237 |
| 2006/0276209 | A1 | * | 12/2006 | Neves et al. .................. 455/466 |

FOREIGN PATENT DOCUMENTS

| EP | 1 003 315   | 5/2000 |
| EP | 1 185 069   | 3/2002 |
| JP | 2001-111621 | 4/2001 |
| WO | WO 00/33536 | 6/2000 |

OTHER PUBLICATIONS

Katsutoshi Nishida, et al. "Proposal of Packet Transport Methods for IP-Host Address and IP-Routing Address Separation Model in IP-Based IMT Network Platform", Technical Report of the IEICE, vol. 102, No. 350, Sep. 30, 2002, pp. 105-110.

Kazuhiro Okanoue, et al. "IP Mobility With Double IP Header", Technical Report of the IEICE, vol. 95, No. 269, Sep. 29, 1995, pp. 139-144.

* cited by examiner

*Primary Examiner* — Chi Pham
*Assistant Examiner* — Mohammad Adhami
(74) *Attorney, Agent, or Firm* — Oblon, Spivak, McClelland, Maier & Neustadt, L.L.P.

(57) ABSTRACT

The object of the present invention is provide a communication control system which can realize a dynamic routing control in units of flows without changing the conventional routing protocol. The routing controller comprises an address information provision requester configured to request the first router to provide address conversion information in accordance with the received predetermined trigger and an address conversion information processing requester configured to request the second router to perform a predetermined processing related to the address conversion information acquired from the first router. The second router comprises an address conversion information manager configured to perform the predetermined processing related to the address conversion information and manage the address conversion information, in accordance with the request from the routing controller, and an address converter configured to change a destination address included in received data based on the address conversion information.

3 Claims, 6 Drawing Sheets

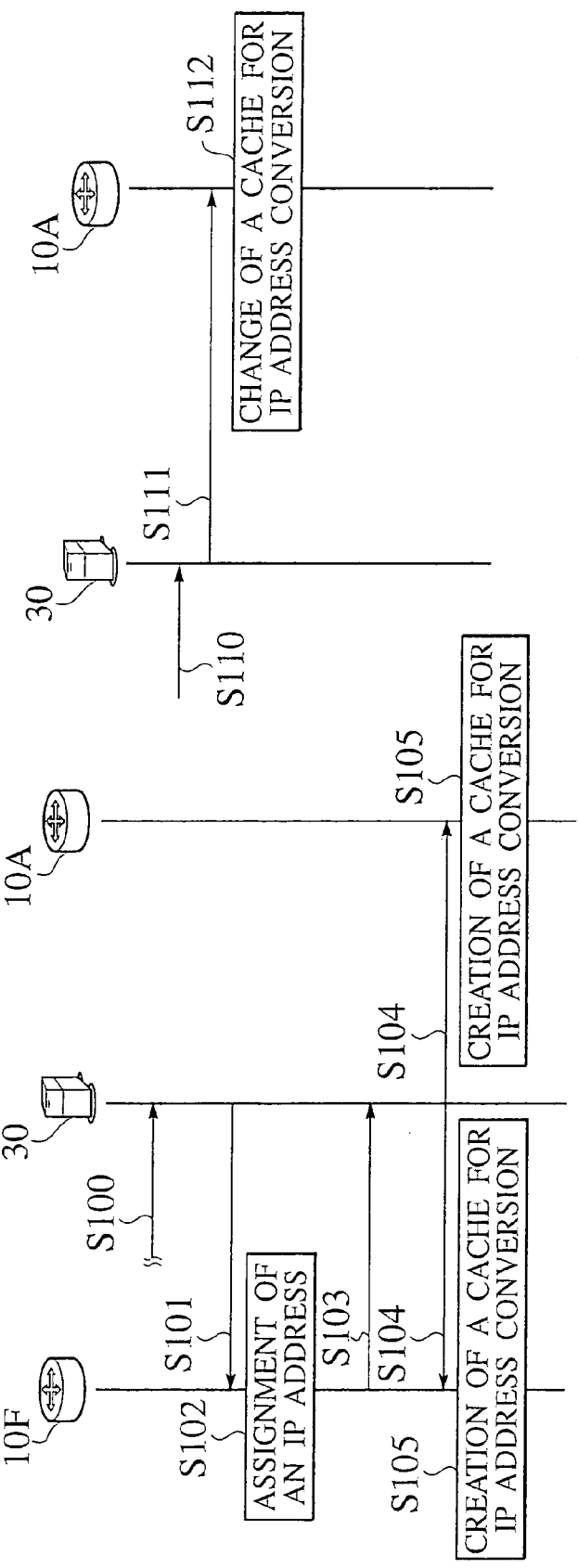
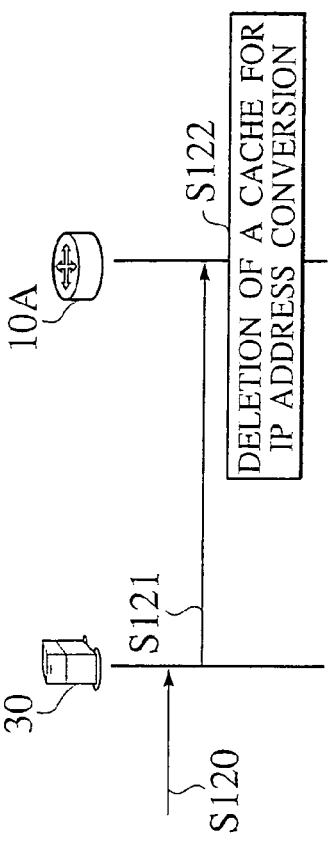
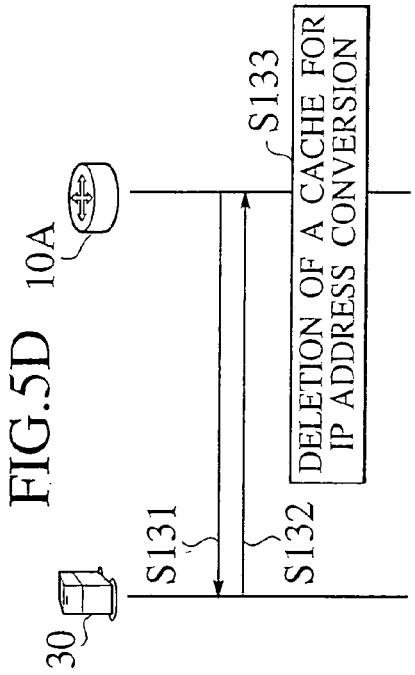
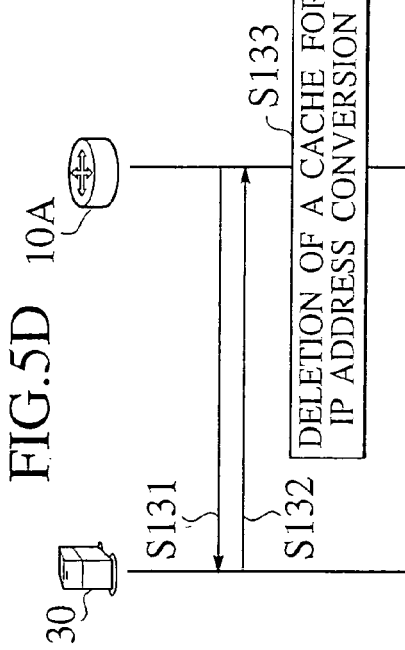

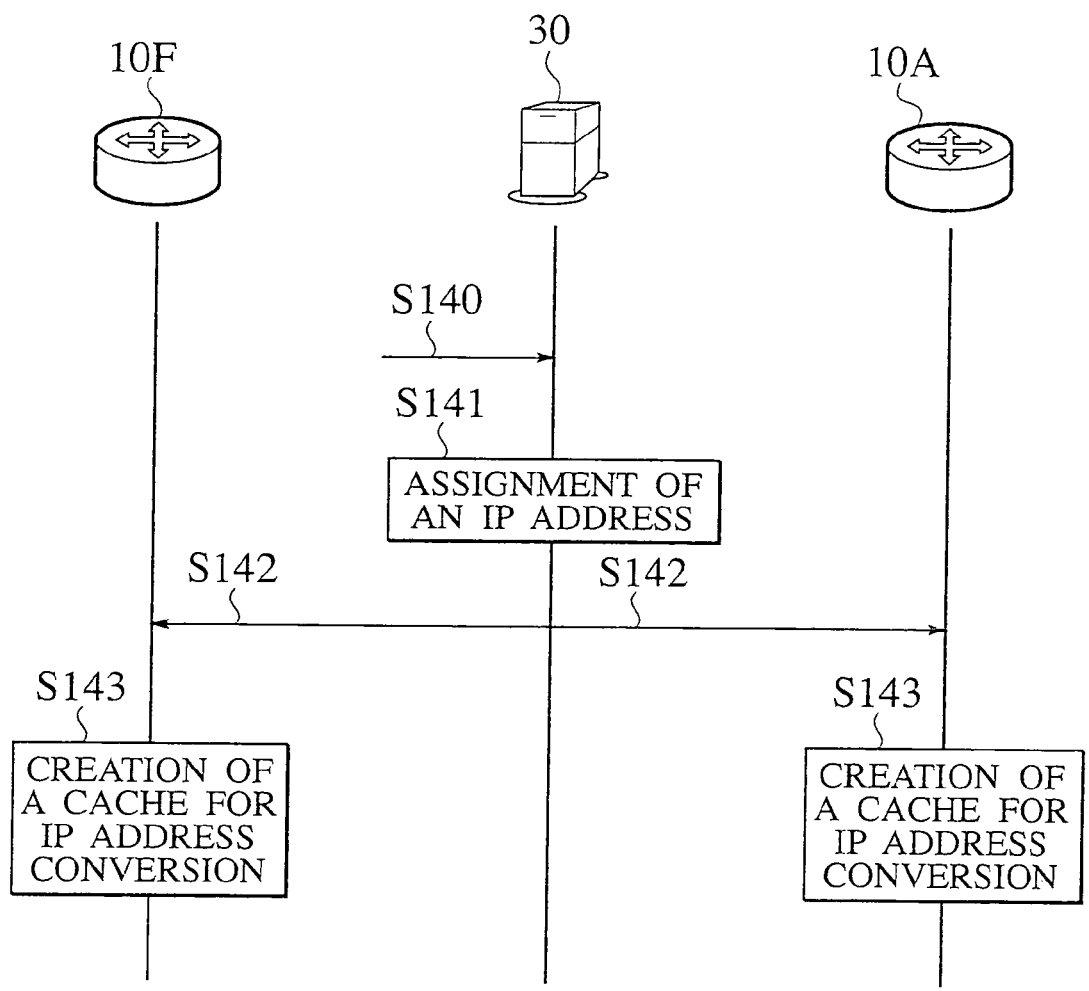

COMMUNICATION CONTROL SYSTEM, COMMUNICATION CONTROL METHOD, ROUTING CONTROLLER AND ROUTER SUITABLY USED FOR THE SAME

CROSS REFERENCE TO RELATED APPLICATION

This application is based upon and claims the benefit of priority from the prior Japanese Patent Application No. P2002-323129, filed on Nov. 6, 2002; the entire contents of which are incorporated herein by reference.

BACKGROUND OF THE INVENTION

1. Field of the Invention

The present invention relates to a communication control system, a communication control method, a routing controller and a router suitably used for the same.

2. Description of the Related Art

In conventional IP networks, a router exchanges routing information with adjacent routers using a routing protocol such as an OSPF (Open Shortest Path First) and a RIP (Routing Information Protocol), and performs a routing processing of received data based on a destination IP address referring to a routing table created by the routing information.

In the conventional IP networks, an "MPLS (Multi Protocol Label Switching)" technique is known as a traffic engineering technique which can realize a routing path backup for rerouting traffic in the event of a link failure or a node failure, and a traffic load distribution.

The MPLS technique is configured to insert a header which is called a "label" into a lower layer than a layer 3, and to perform a routing path management using the label as a virtual routing path. The MPLS technique is called a "layer 2.5 technique".

The MPLS technique can realize a traffic engineering including a QoS control, by associating the label with a specific routing path or a QoS class.

However, the conventional router decides the routing path based on the destination IP address, in accordance with the routing table created in the router. Therefore there is a problem in that it is necessary to restructure the routing table using the routing protocol when a hand-over of a mobile station, a congestion or a failure occurs in the IP network, so that communication in the IP network stops for a certain period.

There is a problem in that the conventional router can not change a routing path of a specific flow dynamically during communication.

There is a problem in that the conventional router can not dynamically route IP packets to a special device such as an accounting device, a monitor device and a media converter device.

The MPLS technique can resolve the above problem partly using the label concept. However, there is a problem in that all routers in the IP networks have to support the MPLS technique which is a special protocol, in the above case.

There is a problem in that the MPLS technique is not suitable for the routing control (the flow control) in small units such as IP packets.

BRIEF SUMMARY OF THE INVENTION

In view of the foregoing, it is an object of the present invention to provide a communication control system and a communication control method which can realize a dynamic routing control of the layer 3 in units of flows without changing the conventional routing protocol, when a hand-over of a mobile station, a congestion or a failure occurs in an IP network, and a routing controller and a router suitably used for the same.

A first aspect of the present invention is summarized as a communication control system comprising a routing controller, a first router and a second router.

The routing controller comprises a trigger receiver configured to receive a predetermined trigger; an address information provision requester configured to request the first router to provide address conversion information in accordance with the received predetermined trigger; and an address conversion information processing requester configured to request the second router to perform a predetermined processing related to the address conversion information acquired from the first router.

The first router comprises an address conversion information provider configured to provide the address conversion information in accordance with the request from the routing controller.

The second router comprises an address conversion information manager configured to perform the predetermined processing related to the address conversion information and manage the address conversion information, in accordance with the request from the routing controller; an address converter configured to change a destination address included in received data based on the address conversion information; and a routing processor configured to perform a routing processing of the received data based on the changed destination address.

A second aspect of the present invention is summarized as a communication control method performed by a routing controller, a first router and a second router, the method comprising the steps of: a) receiving a predetermined trigger in the routing controller; b) requesting the first router to provide address conversion information in accordance with the received predetermined trigger, in the routing controller; c) providing the address conversion information in accordance with the request from the routing controller in the first router; d) requesting the second router to perform a predetermined processing related to the address conversion information acquired from the first router, in the routing controller; e) performing the predetermined processing related to the address conversion information and managing the address conversion information, in accordance with the request from the routing controller, in the second router; f) changing a destination address included in received data based on the address conversion information, in the second router; and g) performing a routing processing of the received data based on the changed destination address, in the second router.

A third aspect of the present invention is summarized as a routing controller comprising a trigger receiver configured to receive a predetermined trigger; an address information provision requester configured to request a first router to provide address conversion information in accordance with the received predetermined trigger; and an address conversion information processing requester configured to request a second router to perform a predetermined processing related to the address conversion information acquired from the first router.

A fourth aspect of the present invention is summarized as a routing controller comprising a trigger receiver configured to receive a predetermined trigger; an address conversion information creator configured to create address conversion information in accordance with the received predetermined trigger; and an address conversion information creation requester configured to request a second router to create the address conversion information.

A fifth aspect of the present invention is summarized as a router comprising an address conversion information manager configured to create and manage address conversion information when a routing controller request the router to create the address conversion information; an address converter configured to change a destination address included in received data based on the address conversion information; and a routing processor configured to perform a routing processing of the received data based on the changed destination address.

In the fifth aspect, the router may further comprise an address conversion information deletion permission requester configured to request the routing controller to permit deletion of the address conversion information. The address conversion information manager may delete the address conversion information upon receiving the deletion permission from the routing controller.

In the fifth aspect, the address conversion information may associate a destination address of received data with a predetermined address. The address converter may encapsulate the destination address of the receive data with the predetermined address. The routing processor may perform the routing processing of the received data using the predetermined address.

BRIEF DESCRIPTION OF THE SEVERAL VIEWS OF THE DRAWINGS

FIG. 5A is a flowchart showing operation of the communication control system according to the first embodiment of the present invention.

FIG. 5B is a flowchart showing operation of the communication control system according to the first embodiment of the present invention.

FIG. 5C is a flowchart showing operation of the communication control system according to the first embodiment of the present invention.

FIG. 5D is a flowchart showing operation of the communication control system according to the first embodiment of the present invention.

FIG. 6 is a flowchart showing operation of the communication control system according to modification 2 of the present invention.

DETAILED DESCRIPTION OF THE INVENTION

<A Configuration of a Communication Control System of a First Embodiment of the Present Invention>

A configuration of a communication control system according to a first embodiment of the present invention will now be described with reference to FIGS. 1 and 4.

Figure 1:
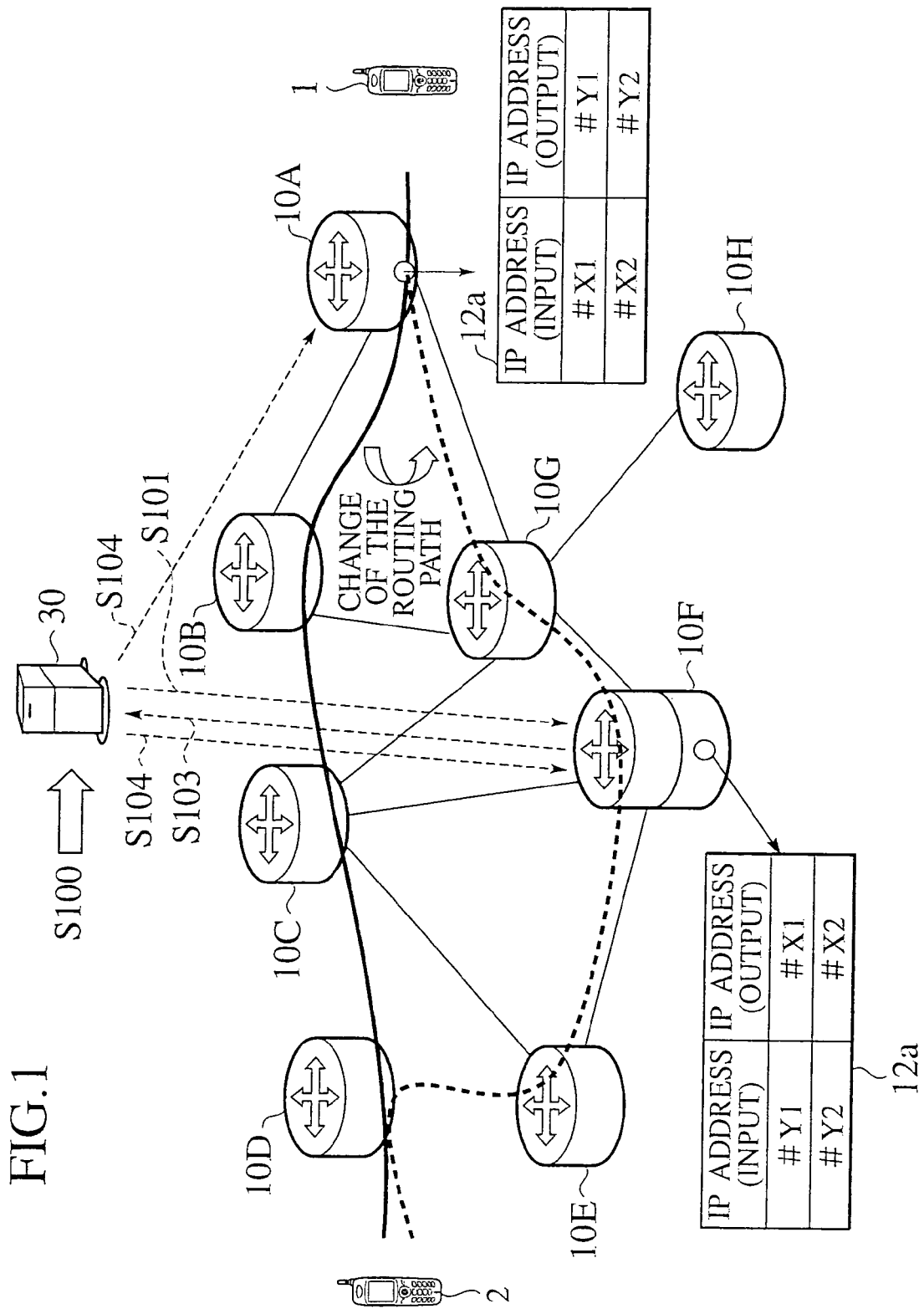
FIG. 1 is a diagram showing an entire configuration of a communication control system according to a first embodiment of the present invention.

As shown in FIG. 1, the communication control system according to the first embodiment is configured with a routing controller 30 and a plurality of routers 10A to 10H.

The router 10F is a first router which is configured with a special device such as an accounting device, a monitor device and a media converter device.

Each of other routers 10A, 10B, 10C, 10D, 10E, 10G and 10H is a second router having a function of the conventional router.

Figure 2:
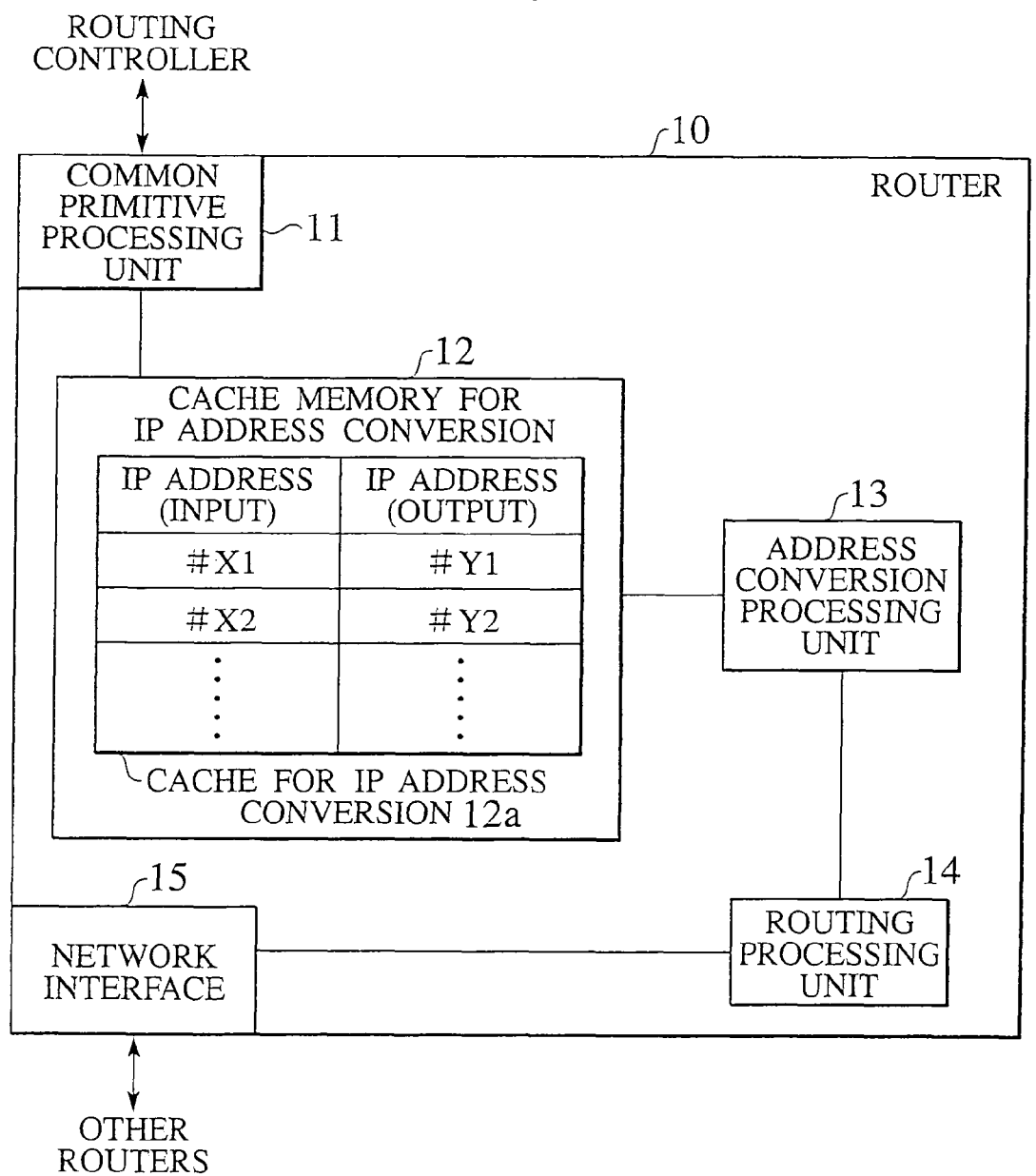
FIG. 2 is a diagram showing functional blocks of a router suitably used for the first embodiment of the present invention.

As shown in FIG. 2, each of the routers 10A to 10H is configured with a common primitive processing unit 11, a cache memory for IP address conversion 12, an address conversion processing unit 13, a routing processing unit 14, network interface 15.

The common primitive processing unit 11 is configured to exchange common primitives with the routing controller 30 using control packets.

Figure 4:
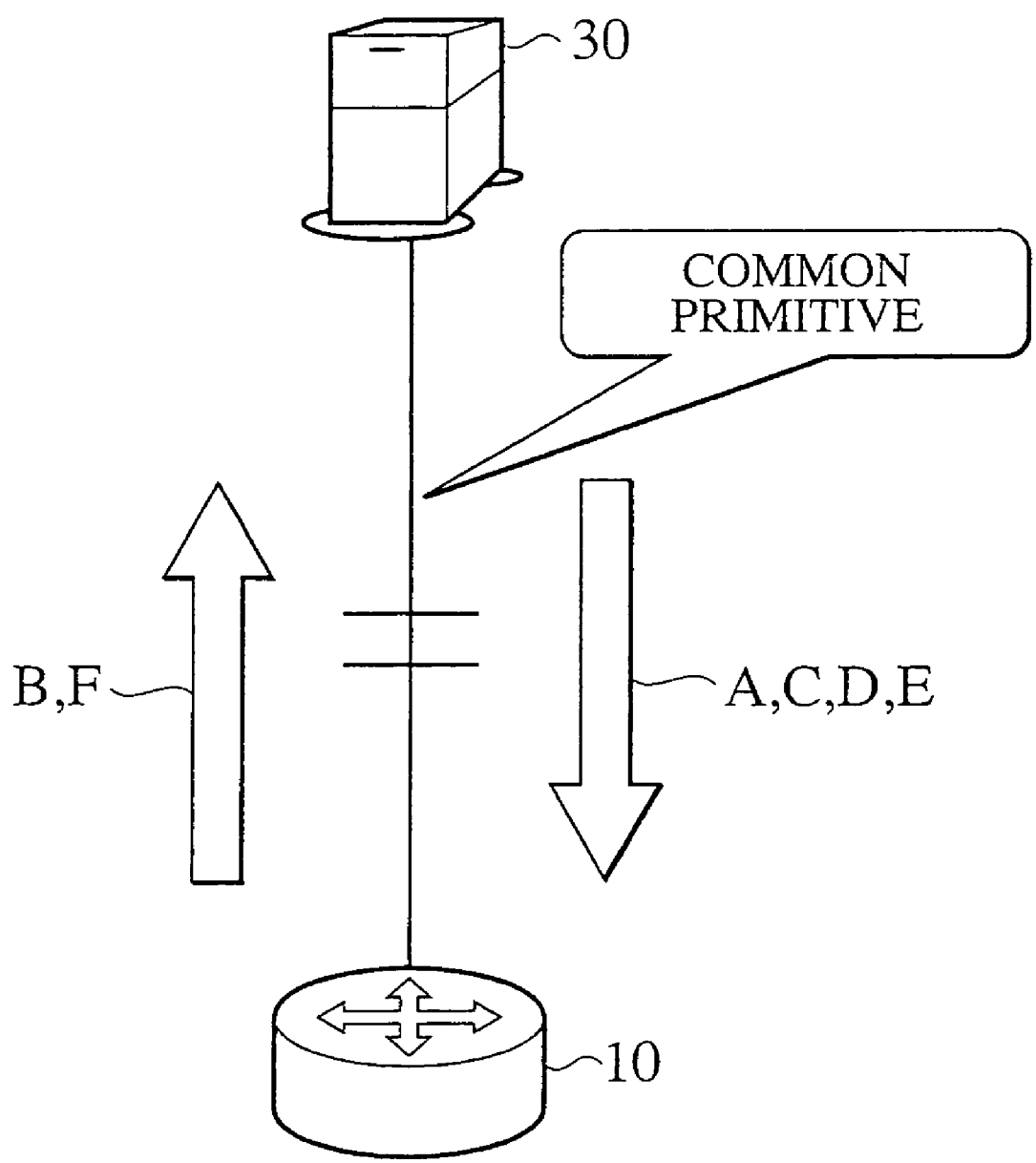
FIG. 4 is a diagram for explaining common primitives between the router and the routing controller which constitute the communication control system according to the first embodiment of the present invention.

To be more specific, as shown in FIG. 4, the common primitive processing unit 11 transmits an IP address assignment notification B and a cache for IP address conversion deletion permission request F via a common primitive (a common interface) for the routing controller 30.

The common primitive processing unit 11 transmits the IP address assignment notification B of the routing controller 30, so as to notify a cache for IP address conversion (address conversion information) 12a related to an assigned IP address in accordance with an IP address assignment request A transmitted from the routing controller 30.

The common primitive processing unit 11 transmits the cache for IP address conversion deletion permission request F to the routing controller 30, so as to request the routing controller 30 to permit deletion of the cache for IP address conversion (the address conversion information) 12a related to the IP address in the cache memory for IP address conversion 12.

The common primitive processing unit 11 selects an IP address from among available IP addresses, referring to the cache memory for IP address conversion 12 in accordance with the IP address assignment request A (an instruction via the common primitive). The common primitive processing unit 11 assigns the selected IP address to a specific flow.

The common primitive processing unit 11 creates the cache for IP address conversion (the address conversion information) 12a related to the assigned IP address in the cache memory for IP address conversion 12.

The common primitive processing unit 11 changes or deletes the cache for IP address conversion (the address conversion information) 12a related to a predetermined IP address in the cache memory for IP address conversion 12, in accordance with a cache for IP address conversion change request D or a cache for IP address conversion deletion request E (an instruction via the common primitive) transmitted from the routing controller 30.

The cache memory for IP address conversion 12 is configured to store the cache for IP address conversion (the address conversion information) 12a.

To be more specific, the cache memory for IP address conversion 12 associates an input IP address with an output IP address as the cache for IP address conversion 12a.

When the address conversion processing unit 13 receives data (IP packets) in which an input IP address stored in the cache memory for IP address conversion 12 is set as a destination IP address, the address conversion processing unit 13 converts the destination IP address into an output IP address associated with the input IP address.

In an example of FIG. 2, when the address conversion processing unit 13 receives data (IP packets) in which an input IP address #X1 is set as a destination IP address, the address conversion processing unit 13 converts the destination IP address into an output IP address #Y1, referring to the cache memory for IP address conversion 12.

The routing processing unit 14 is configured to perform a routing processing of data after the address conversion, based on the output IP address (the changed destination address), referring to a routing table.

The network interface 15 is configured to provide a physical interface with other routers or other routing controllers.

In the first embodiment, the common primitive processing unit 11 constitutes an address conversion information provider configured to provide address conversion information (the cache for IP address conversion 12a related to an IP address which is assigned for the router 10F) in accordance with a request (the IP address assignment request A) from the routing controller 30.

The common primitive processing unit 11 constitutes an address conversion information manager configured to perform a predetermined processing (a creation processing, a change processing, and a deletion processing) related to the address conversion information and manage the address conversion information, in accordance with the request (the cache for IP address conversion creation request C, the cache for IP address conversion change request D and the cache for IP address conversion deletion request E) from the routing controller 30.

The address conversion processing unit 13 constitutes an address converter configured to change a destination address included in received data based on the address conversion information (the cache for IP address conversion 12a).

The routing processing unit 14 constitutes a routing processor configured to perform a routing processing of the received data (the data after the address conversion) based on the changed destination address.

The routing controller 30 is configured to perform a routing control based on an IP address assignment control for a plurality of routers 10A to 10H.

Figure 3:
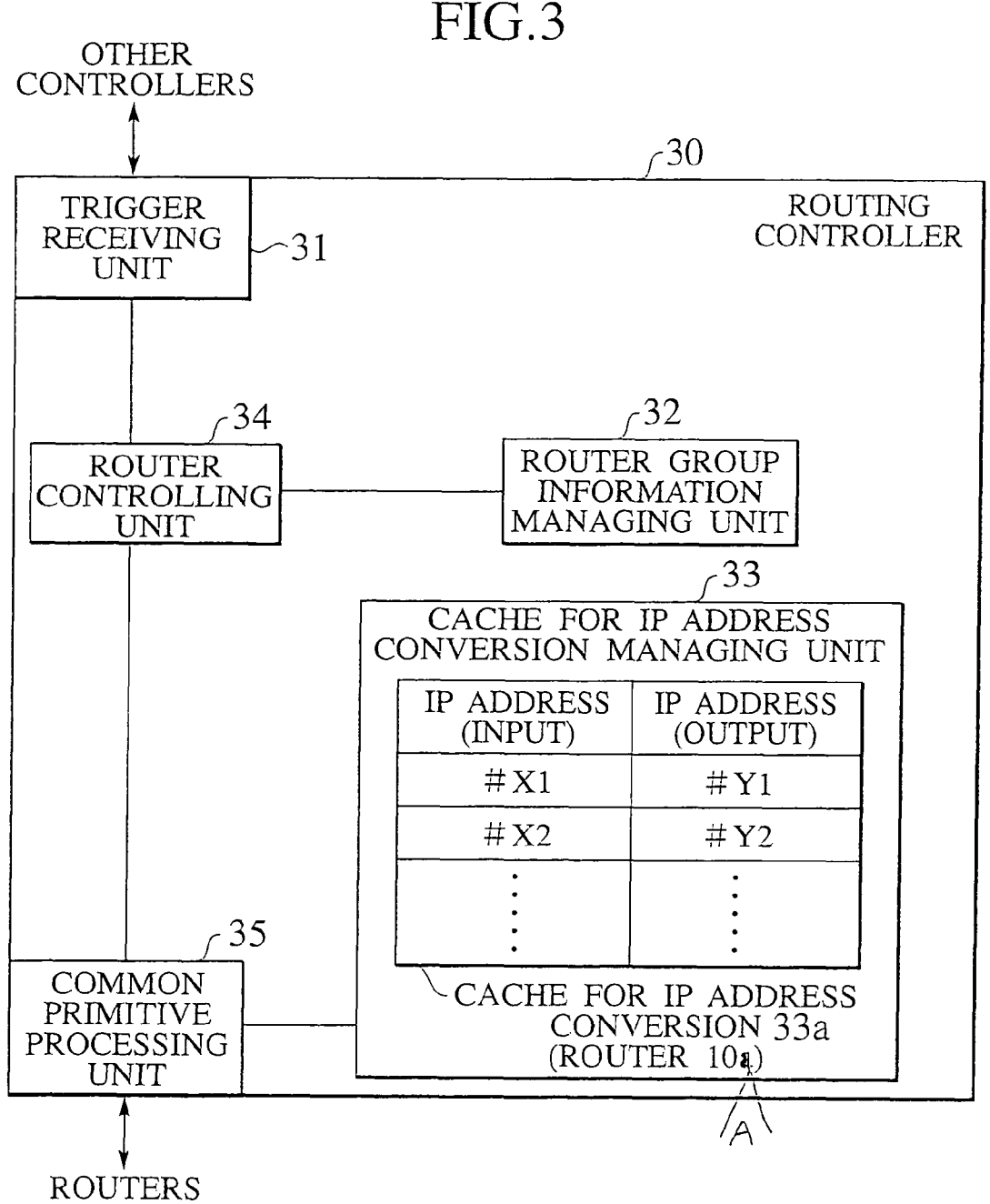
FIG. 3 is a diagram showing functional blocks of a routing controller suitably used for the first embodiment of the present invention.

As shown in FIG. 3, the routing controller 30 is configured with a trigger receiving unit 31, a router group information managing unit 32, a cache for IP address conversion managing unit 33, a router controlling unit 34 and a common primitive processing unit 35.

The trigger receiving unit 31 is configured to receive (detect) a predetermined trigger from other controllers such as routing controller and service controller as a trigger with which the routing controller 30 instructs to the routers 10A to 10H via the common primitive.

A hand-over of a mobile station 1 or 2, an execution of controlling various services such as an accounting, a traffic monitoring and a media conversion and a quality degradation of a specific flow due to an occurrence of a congestion or a failure in the IP network are considered as an example of the trigger.

The router group information managing unit 32 is configured to manage router group information of routers which are managed by the routing controller 30.

For example, a physical connection relationship (topology information) of a plurality of routers 10A to 10H which are managed by the routing controller 30 and routing information are considered as the router group information. The routing information shows routers via which a specific flow is routed.

The cache for IP address conversion managing unit 33 is configured to store a cache for IP address conversion (address conversion information) 33a per router. To be more specific, the cache for IP address conversion managing unit 33 associates an input IP address with an output IP address as the cache for IP address conversion 33a.

The router controlling unit 34 searches for routers in a routing path in which a specific flow is routed, referring to the router group information managing unit 32, when the trigger receiving unit 31 detects a predetermined trigger. The router controlling unit 34 decides an optimal router 10F from among the searched routers which the routing controller 30 instructs via the common primitive. The router controlling unit 34 decides what kind of instruction the routing controller 30 transmits to the decided optimal router 10F.

The common primitive processing unit 35 is configured to exchange the common primitive with the routers 10A to 10H using control packets.

To be more specific, as shown in FIG. 4, the common primitive processing unit 35 transmits the IP address assignment request A, the cache for IP address conversion creation request C, the cache for IP address conversion change request D, and the cache for IP address conversion deletion request E, via the common primitive (the common interface) for the routers 10A to 10H.

The common primitive processing unit 35 transmits the IP address assignment request A to the router 10F decided by the router controlling unit 34, when the trigger receiving unit 31 detects a predetermined trigger such as an occurrence of a hand-over of a mobile station, a congestion or a failure in the IP network. The IP address assignment request A requests the router 10F to assign an IP address for the router 10F.

The common primitive processing unit 35 transmits the cache for IP address conversion creation request C to the router 10A decided by the router controlling unit 34, when the trigger receiving unit 31 detects a predetermined trigger such as the occurrence of a hand-over of a mobile station, a congestion or a failure in the IP network. The cache for IP address conversion creation request C requests the router 10A to create the cache for IP address conversion 12a.

To be more specific, the common primitive processing unit 35 requests the router 10A which performs a routing processing based on an IP address to assign an IP address for a specific flow by the cache for IP address conversion creation request C, so that the router 10A can route the specific flow via the router 10F, that is to say, the router 10A can change the routing path of the specific flow.

The common primitive processing unit 35 transmits the cache for IP address conversion change request D to the router 10A decided by the router controlling unit 34, when the trigger receiving unit 31 detects a predetermined trigger such as the occurrence of a hand-over of a mobile station, a congestion or a failure in the IP network. The cache for an IP address change request D requests the router 10A to change the cache for IP address conversion 12a.

The common primitive processing unit 35 transmits the cache for IP address conversion deletion request E to the router 10A decided by the router controlling unit 34, when the trigger receiving unit 31 detects a predetermined trigger such as the occurrence of a hand-over of a mobile station, a congestion or a failure in the IP network. The cache for an IP address deletion request E requests the router 10A to delete the cache for IP address conversion 12a.

For example, when the hand-over of the mobile station is detected, the common primitive processing unit 35 transmits the cache for IP address conversion deletion request E to a router to which the mobile station is connected before the hand-over.

The common primitive processing unit 35 changes and deletes the cache for IP address conversion 33a (address conversion information) in the cache for IP address conversion managing unit 33, in accordance with the IP address assignment request B transmitted from the router 10F.

The common primitive processing unit 35 judges whether the cache for IP address conversion 12a can be deleted in the router 10F or not, upon receiving the cache for IP address conversion deletion permission request F from the router 10F, so as to return the judgment result to the router 10F.

In the first embodiment, the common primitive processing unit 35 constitutes an address information provision requester configured to request the first router 10F to provide address conversion information in accordance with the received predetermined trigger.

The common primitive processing unit 35 constitutes an address conversion information processing requester configured to request the second router 10A to perform a predetermined processing related to the address conversion information acquired from the first router 10F.

The common primitive processing unit 35 constitutes an address conversion information creation requester configured to request a second router 10A to create the address conversion information acquired from the first router 10F.

The common primitive processing unit 35 constitutes an address conversion information change requester configured to request a second router 10A to change the address conversion information.

The common primitive processing unit 35 constitutes an address conversion information deletion requester configured to request a second router 10A to delete the address conversion information.

<An Operation of the Communication Control System According to the First Embodiment>

An operation of the communication control system according to the first embodiment will be described with reference to FIG. 1 to FIG. 5.

First, an example in which the routing path of data (IP packets) from the mobile station 1 to the mobile station 2 is changed from a first routing path (shown with a solid line) to a second routing path (shown with a dotted line) will be described. There are routers 10A, 10B, 10C and 10D in the first routing path, as shown in FIG. 1. There are routers 10A, 10G, 10F, 10E and 10D in the first routing path, as shown in FIG. 1.

As shown in FIG. 5A, in step 100, the trigger receiving unit 31 of the routing controller 30 detects a predetermined trigger such as the occurrence of a congestion or a failure in the first routing path, and an instruction to change the first routing path to the second routing path including a special device such as a router 10F.

In step 101, the common primitive processing unit 35 of the routing controller 30 transmits the IP address assignment request A requesting for an IP address assignment, to the router 10F decided by the router controlling unit 34.

In step 102, the common primitive processing unit 11 of the router 10F selects an IP address #Y1 from among available IP addresses, referring to the cache memory for IP address conversion 12, in accordance with the IP address assignment request A transmitted from the routing controller 30. The router 10A routes IP packets which include the IP address #Y1 as a destination address to the router 10F via the router 10G, and the router 10F routed the IP packets to the mobile station 2 via the routers 10E and 10D.

In step 103, the common primitive processing unit 11 of the router 10F transmits the IP address assignment notification B for notifying the IP address #Y1 to the routing controller 30.

In step 104, the common primitive processing unit 35 of the routing controller 30 transmits the cache for IP address conversion creation request C to the routers 10A and 10F decided by the router controlling unit 34 in accordance with the received IP address assignment notification B. The cache for IP address conversion creation request C requests the routers 10A and 10F to create the cache for IP address conversion 12a related to the IP address #Y1.

The common primitive processing unit 35 of the routing controller 30 creates and stores the cache for IP address conversion 33a related to the IP address #Y1 in the cache for IP address conversion managing unit 33.

In step 105, each of the common primitive processing units 11 of the routers 10A and 10F creates and stores the cache for IP address conversion 12a related to the IP address #Y1 in the cache memory for IP address conversion 12, in accordance with the received cache for IP address conversion creation request C.

To be more specific, as shown in FIG. 1, the common primitive processing unit 11 of the routers 10A creates the cache for IP address conversion 12a for converting the IP address #X1 of the mobile station 2 into the IP address #Y1 for the router 10F.

On the other hand, as shown in FIG. 1, the common primitive processing unit 11 of the routers 10F creates the cache for IP address conversion 12a for converting the IP address #Y1 for the router 10F into the IP address #X1 of the mobile station 2.

When the address conversion processing unit 13 of the router 10A receives IP packets which include the IP packet #X1 of the mobile station 2 as a destination address, the address conversion processing unit 13 converts the destination address (the IP address #X1 of the mobile station 2) into the output IP address (the IP address #Y1 for the router 10F), referring to the cache memory for IP address conversion 12.

Then, the routing processing unit 14 of the router 10A performs a routing processing based on the output IP address, so as to transmit the IP packet to the adjacent router 10G via the network interface 15.

When the address conversion processing unit 13 of the router 10F receives the IP packets which include the IP packet #Y1 of the mobile station 2 as a destination address, the address conversion processing unit 13 converts the destination address (the IP address #Y1 for the router 10F) into the output IP address (the IP address #X1 of the mobile station 2), referring to the cache memory for IP address conversion 12.

Then, the routing processing unit 14 of the router 10F performs a routing processing based on the output IP address, so as to transmit the IP packet to the adjacent router 10E via the network interface 15.

In step 102, the common primitive processing units 11 of the routers 10F may create and store the above cache for IP address conversion 12a in the cache memory for IP address conversion 12. In this case, the common primitive processing unit 35 of the routing controller 30 transmits the cache for IP address conversion creation request C to the routers 10A only, in step 104.

The routers 10A and 10G can route IP packets including the IP address assigned by the router 10F as a destination address to the router 10F. The router 10F can identify the mobile station for which the IP packets are destined.

For example, as shown in FIG. 1, the routers 10A and 10G can route the IP packet including the IP address #Y1 as a destination address to the router 10F. The router 10F can identify the mobile station 2 for which the IP packets including the IP address #Y1 as a destination address are destined.

The routers 10A and 10G can route the IP packet including the IP address #Y2 as a destination address to the router 10F. The router 10F can identify the mobile station 3 (not shown)

for which the IP packets including the IP address #Y1 as a destination address are destined.

To be more specific, when the router 10F receives the IP packets including the IP address #Y1 as a destination address, the router 10F converts the destination address #Y1 into the output IP address (the IP address of the mobile station 2) #X1, so as to route the IP packets including the IP address #X1 as a destination address.

When the router 10F receives the IP packets including the IP address #Y2 as a destination address, the router 10F converts the destination address #Y2 into the output IP address (the IP address of the mobile station 3) #X2, so as to route the IP packets including the IP address #X2 as a destination address.

Second, an example in which the routing controller 30 changes the cache for IP address conversion 12a of the router 10A will be described.

As shown in FIG. 5B, in step 110, the trigger receiving unit 31 of the routing controller 30 detects a predetermined trigger such as the occurrence of a congestion or a failure in the first routing path, and an instruction to change the first routing path to the second routing path including a special device such as a router 10F.

In step 111, the common primitive processing unit 35 of the routing controller 30 transmits the cache for IP address conversion change request D to the router 10A decided by the router controlling unit 34. The cache for IP address conversion change request D requests the router 10A to change the cache for IP address conversion 12a.

In step 112, the common primitive processing unit 11 of the router 10A changes the cache for IP address conversion 12a related to the IP address for the router 10F specified by the received cache for IP address conversion change request D.

Third, an example in which the routing controller 30 deletes the cache for IP address conversion 12a of the router 10A will be described.

As shown in FIG. 5C, in step 120, the trigger receiving unit 31 of the routing controller 30 detects a predetermined trigger such as the occurrence of a congestion or a failure in the first routing path, and an instruction to change the first routing path to the second routing path including a special device such as a router 10F.

In step 121, the common primitive processing unit 35 of the routing controller 30 transmits the cache for IP address conversion deletion request E to the router 10A decided by the router controlling unit 34. The cache for IP address conversion deletion request E requests the router 10A to delete the cache for IP address conversion 12a.

In step 122, the common primitive processing unit 11 of the router 10A deletes the cache for IP address conversion 12a related to the IP address for the router 10F specified by the received cache for IP address conversion deletion request E.

Fourth, an example in which the router 10A takes the initiative to delete the cache for IP address conversion 12a of the router 10A will be described.

As shown in FIG. 5D, in step 131, when the common primitive processing unit 11 of the router 10A detects a predetermined trigger such as the expiration of a predetermined time interval, the common primitive processing unit 11 transmits the cache for IP address conversion deletion permission request F to the routing controller 30. The cache for IP address conversion deletion permission request F requests the routing controller 30 to permit deletion of the cache for IP address conversion 12a related to the IP address for the router 10F in the cache memory for IP address conversion 12.

In step 132, the common primitive processing unit 35 of the routing controller 30 transmits a permission response to the router 10A. The permission response shows whether or not deletion of the cache for IP address conversion 12a related to the IP address for the router 10F is permitted.

In step 133, the common primitive processing unit 11 of the router 10A deletes the cache for IP address conversion 12a related to the IP address for the router 10F.

<Functions and Effects of the Communication Control System According to the First Embodiment>

According to the communication control system of the first embodiment, the common primitive processing unit 11 of the router 10F notifies the assigned IP address of the routing controller 30, and the routing controller 30 instructs the router 10A to perform a predetermined processing related to the cache for IP address conversion 12a.

As a result, it is possible to change the routing path of data (IP packets), to respond to a hand-over of mobile stations, to route the data (the IP packets) to a special device and to perform a traffic load distribution (i.e. to avoid a congestion in the previous routing path).

A Modified Example 1

The present invention is not limited to the above embodiment and can be applied to the following modified example 1.

In the modified example 1, the address conversion processing unit 13 of the router 10A can be configured to encapsulate the destination address of the receive data with the predetermined address, instead of changing the destination address included in the received IP address.

To be more specific, the address conversion processing unit 13 of the router 10A encapsulates an originator address included in the received IP packet with "the IP address of the router 10A", and encapsulates an destination address included in the received IP packet with "the IP address of the router 10F".

The address conversion processing unit 13 of the router 10F performs a decapsulation of the received IP packets, so as to transfer the IP packets to the adjacent router 10E.

A Modified Example 2

The present invention is not limited to the above embodiment and can be applied to the following modified example 2.

In the modified example 2, the routing controller 30 can be configured to create the cache for IP address conversion 33a related to the IP address for the router 10F by itself, instead of instructing the router 10F to create the cache for IP address conversion 33a related to the IP address for the router 10F.

Referring to FIG. 6, an operation of the communication control system according to the modified example 2 will be described.

In the modified example 2, the common primitive processing unit 35 of the routing controller 30 reserves a predetermined IP address group to be assigned for changing the routing path.

As shown in FIG. 6, in step 140, the trigger receiving unit 31 of the routing controller 30 detects a predetermined trigger.

In step 141, the common primitive processing unit 35 of the routing controller 30 assigns to select an IP address for the router 10F from among the reserved predetermined IP address group.

In step 142, the common primitive processing unit 35 of the routing controller 30 transmits the cache for IP address conversion creation request C to the routers 10A and 10F decided by the router controlling unit 34. The cache for IP address conversion creation request C requests the routers 10A and 10F to create the cache for IP address conversion 12a related to the IP address for the router 10F.

In step 143, the common primitive processing unit 11 of the routers 10A and 10F creates and stores the cache for IP address conversion 12a related to the IP address conversion in the cache memory for IP address conversion 12, in accordance with the received cache for IP address conversion creation request C.

To be more specific, the common primitive processing unit 11 of the routers 10A creates the cache for IP address conversion 12a for converting the IP address #X1 of the mobile station 2 into the IP address #Y1 for the router 10F.

The common primitive processing unit 11 of the routers 10F creates the cache for IP address conversion 12a for converting the IP address #Y1 for the router 10F into the IP address #X1 of the mobile station 2.

The communication control system according to the modified example 2 can reduce a time for controlling a change of the routing path.

For example, when the IP address assignment request A is transmitted to the router 10F, the router 10F has to perform a predetermined control processing responding to the IP address assignment request A, so that a delay occurs during a hand-over control of a mobile station. However, the communication control system according to the modified example 2 can avoid the occurrence of the delay.

As described above, according to the present invention, it is possible to perform a dynamic routing control such as a dynamic change of a routing path in the case of a hand-over of a mobile station, a decision of an anchor point for supporting a micro mobility, a traffic load distribution routing in the case of an occurrence of a congestion in an IP network, a dynamic routing of a specific flow to a special device such as an accounting device, a monitor device, a media converter device per flow (IP packet), without changing the conventional routing protocol such as the OSPF and the RIP, and using the special layer 2.5 technique such as the MPLS technique.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concept as defined by the appended claims and their equivalents.

What is claimed is:

1. A communication control system comprising:
a routing controller configured to switch a routing path between routers from a first routing path to a second routing path;
a first router located on the second routing path; and
a second router located on a demarcation point of the first routing path and the second routing path; wherein,
the routing controller includes
a trigger receiver configured to receive a trigger indicating a need to route via the first router in a case where the first router has a service control function including an accounting function, a monitoring function or a media converting function;
an address information provision requester configured to send a request to the first router to provide address conversion information in accordance with reception of the trigger;
an address conversion information creation requester configured to send a request to the second router to create first address conversion information, which associates a destination address of received data with an IP address of the first router, for converting data destined for a destination terminal to data destined for the first router, and to send a request to the first router to create second address conversion information for converting data destined for the first router to data destined for the destination terminal, based on the address conversion information acquired from the first router;
an address conversion information change requester configured to send a request to the second router to change the first address conversion information; and
an address conversion information deletion requestor configured to send a request to the second router to delete the first address conversion information; and
the first router including
a address conversion information provider configured to provide address conversion information to the routing controller in accordance with the request to provide address conversion information sent from the routing controller;
a first address conversion information manager configured to create and manage the second address conversion information in accordance with the request to create second address conversion information from the routing controller;
a first address converter configured to convert a destination address of received data based on the second address conversion information; and
a first routing processor configured to perform a routing processing of the data converted by the first address converter; and
the second router including
a second address conversion information manager configured to create and manage the first address conversion information in accordance with the request to the second router to create first address conversion information and the request to the second router to change the first address conversion information from the routing controller;
a second address converter configured to convert a destination address of received data based on the first address conversion information by encapsulating the destination address of the received data with the IP address of the first router;
a second routing processor configured to perform a routing processing of the data converted by the second address converter using the IP address of the first router; and
an address conversion information deletion permission requester configured to request the routing controller to permit deletion of the first address conversion information, wherein the second address conversion information manager is configured to delete the first address conversion information upon receiving the deleting permission from the routing controller.

2. A routing controller configured to switch a routing path between routers from a first routing path to a second routing path, the routing controller comprising:
a trigger receiver configured to receive a trigger indicating a need to route via the first router on the second routing path in a case where the first router has a service control function including an accounting function, a monitoring function or a media converting function;

an address information provision requester configured to send a request to the first router to provide address conversion information in accordance with reception of the trigger;
an address conversion information creation requester configured to send a request to a second router, which is located on a demarcation point of the first routing path and the second routing path, to create first address conversion information, which associates a destination address of received data with an IP address of the first router, for converting data destined for a destination terminal to data destined for the first router, and to send a request to the first router to create second address conversion information for converting data destined for the first router to data destined for the destination terminal, based on the address conversion information acquired from the first router;
an address conversion information change requester configured to send a request to the second router to change the first address conversion information; and
an address conversion information deletion requestor configured to request the second router to delete the first address conversion information.

3. A communication control method for
switching, by a routing controller, a routing path between routers from a first routing path to a second routing path, wherein a first router is located on the second routing path, and a second router is located on a demarcation point of the first routing path and the second routing path, comprising;
receiving, at the routing controller, a trigger indicating a need to route via the first router in a case where the first router has a service control function including an accounting function, a monitoring function or a media converting function;
sending a request, by the routing controller, to the first router to provide address conversion information in accordance with reception of the trigger;
sending a request, by the routing controller, to the second router to create first address conversion information, which associates a destination address of received data with an IP address of the first router, for converting data destined for a destination terminal to data destined for the first router, and sending a request to the first router to create second address conversion information for converting data destined for the first router to data destined for the destination terminal, based on the address conversion information acquired from the first router;
providing, from the first router, address conversion information to the routing controller in accordance with the request to provide address conversion information from the routing controller;
creating and managing, by the first router, the second address conversion information in accordance with the request to create second address conversion information from the routing controller;
converting, by the first router, a destination address of received data based on the second address conversion information;
performing, by the first router, a routing processing of the data converted by the first address converter;
creating and managing, by the second router, the first address conversion information in accordance with the request to create first address conversion information from the routing controller;
converting, by the second router, a destination address of received data based on the first address conversion information by encapsulating the destination address of the received data with the IP address of the first router;
performing, by the second router, a routing processing of the data converted by the second address converter using the IP address of the first router; and
requesting, by the routing controller, the second router to delete the first address conversion information.

* * * * *